No. 651,048. Patented June 5, 1900.
C. H. LEGGETT & F. STONE-BURROWS.
SPRAYER OR ATOMIZER.
(Application filed Jan. 20, 1900.)

(No Model.) 2 Sheets—Sheet 1.

WITNESSES:

INVENTORS:
Clinton H. Leggett and Frank Stone-Burrows,
By Attorneys,

UNITED STATES PATENT OFFICE.

CLINTON H. LEGGETT AND FRANK STONE-BURROWS, OF NEW YORK, N. Y., ASSIGNORS TO LEGGETT & BROTHER, OF SAME PLACE.

SPRAYER OR ATOMIZER.

SPECIFICATION forming part of Letters Patent No. 651,048, dated June 5, 1900.

Application filed January 20, 1900. Serial No. 2,215. (No model.)

*To all whom it may concern:*

Be it known that we, CLINTON H. LEGGETT, a resident of New York, borough of Manhattan, county of New York, and FRANK STONE-BURROWS, a resident of New York, borough of Brooklyn, county of Kings, State of New York, have invented certain new and useful Improvements in Sprayers or Atomizers, of which the following is a specification.

This invention relates to sprayers, atomizers, and vaporizers, and aims to provide an improved device of this kind especially applicable for spraying plants, trees, shrubs, or animals.

Many devices have heretofore been produced for applying a poisonous spray to vegetation or to animals to exterminate obnoxious and injurious insects. These are generally adapted to be carried in one hand and operated with the other hand, and usually comprise a reservoir for the solution to be sprayed, a force pump, and an atomizer or ejecting nozzle.

Our present improvements relate to devices of this character, and our invention provides various features of improvement in construction and arrangement of parts, all of which will be fully hereinafter set forth.

Figure 1:
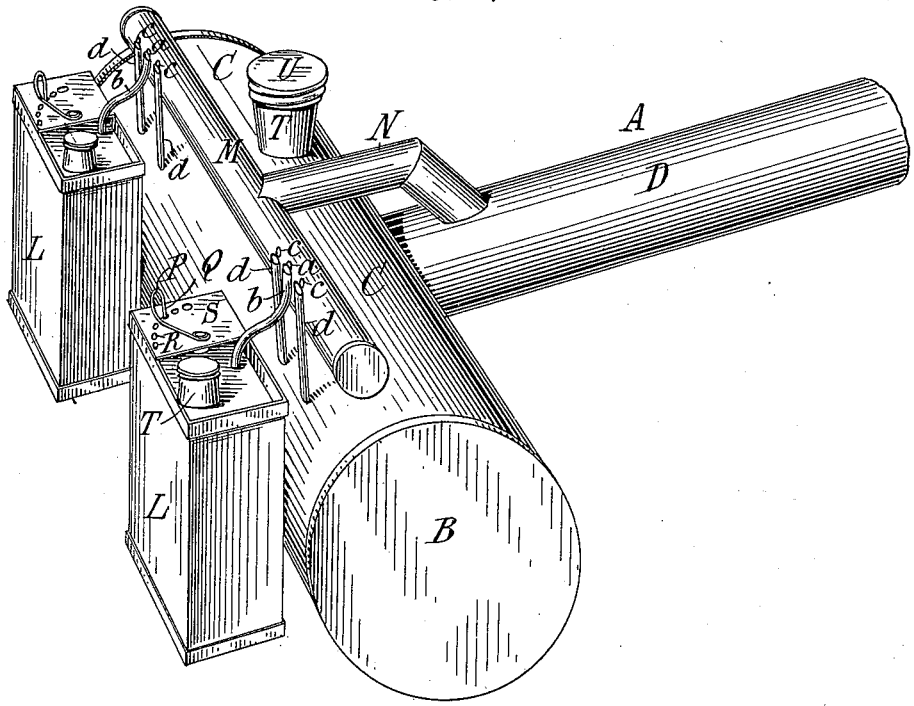
Figure 2:
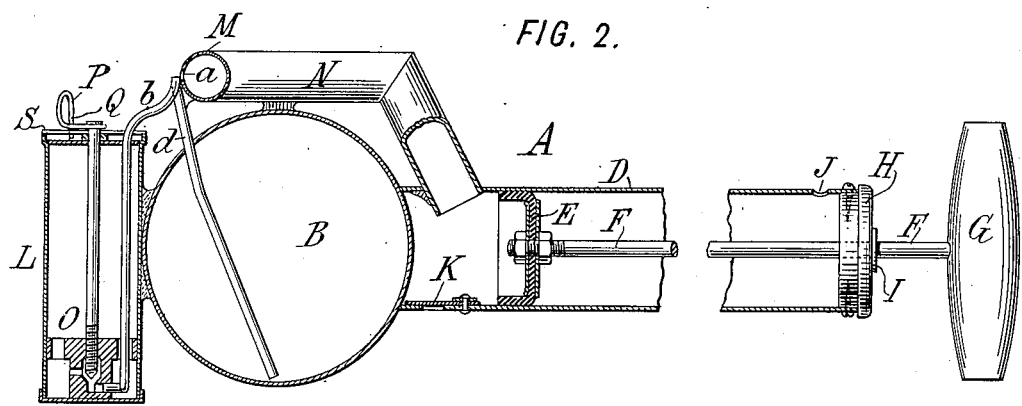
Figure 3:
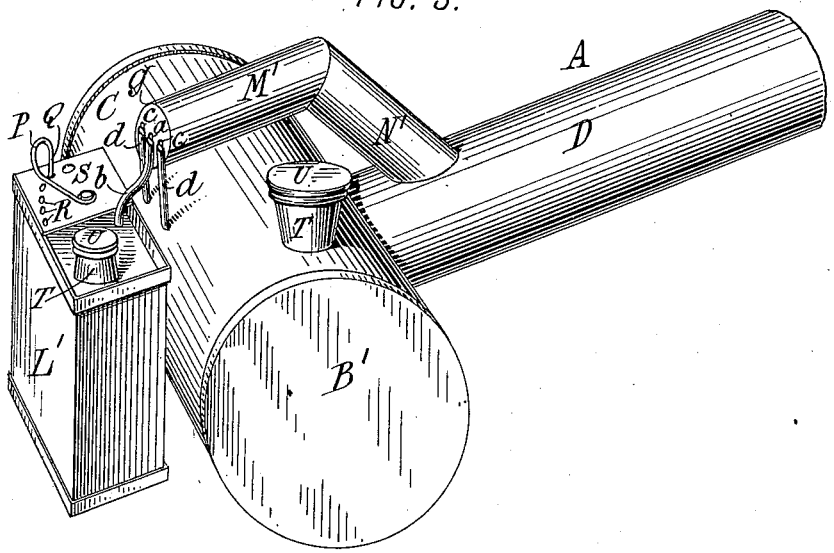
Figure 4:
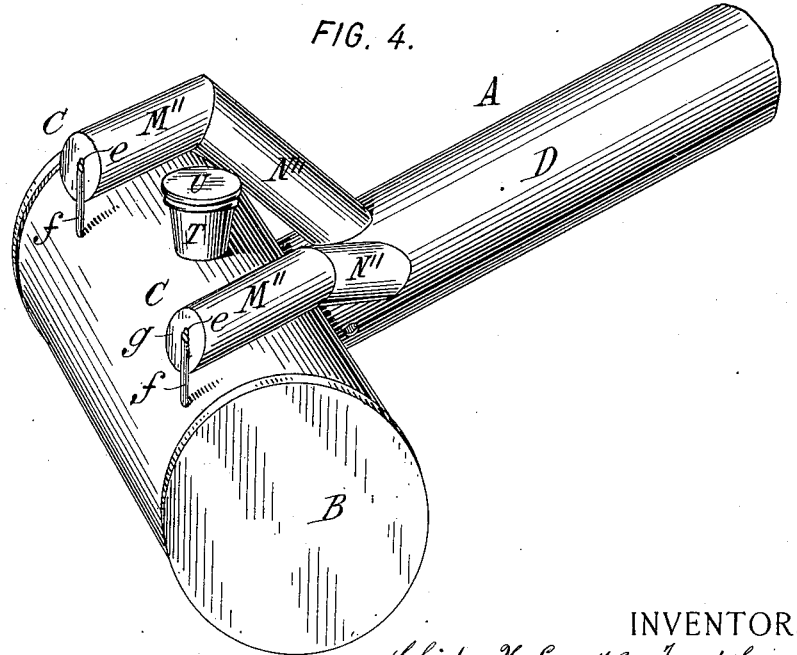

In the accompanying drawings, which illustrate certain adaptations of our invention, Figure 1 is a perspective view showing the preferred form for improved sprayer. Fig. 2 is a vertical section thereof cut through the axis of the pump and the interior of one oil-reservoir. Fig. 3 is a fragmentary perspective view showing one modification, and Fig. 4 is a similar view showing another modification.

Referring to the drawings, A represents an air-pump, B a tank, and C an atomizer. The pump may be any suitable force-pump; but is preferably formed with a cylinder D, within which is a cupped-leather piston E, operated by a rod F, through the medium of a handle G, which rod is guided in the head H of the cylinder and is arrested by a stop I on the rod striking the head, so that the piston can be stopped at a predetermined point in its movement.

J is a relief-aperture communicating with the pump-chamber in the cylinder at rear of the piston, and K is an inlet-valve in front of the piston.

As thus far described, the parts may be of any usual or suitable construction, those shown being taken as a convenient example of a pump adapted to be held in one hand while being operated by the other hand and adapted to support a tank and atomizer.

Our present improvements are applicable especially to sprayers in which two liquids or solutions are simultaneously atomized, and in describing the preferred form of our invention we will describe it as applied to such a sprayer, referring particularly to Figs. 1 and 2, in which L represents reservoirs for holding oil or other liquid to be vaporized simultaneously with the water or a solution contained in the tank.

According to one feature of improvement we provide for the simultaneous independent atomizing of a plurality of liquids or solutions at adjacent points, preferably in the case of oil or water, employing special atomizers for each liquid and a greater number of atomizers for one than for the other. As shown in Fig. 1, a jet-hole $a$ opposite an oil-pipe $b$ is located intermediate of two adjacent jet-holes $c$ opposite water-pipes $d$. The oil-pipe leads from the oil-reservoir and the water-pipes from the water-tank, and the air-jets receive air from the pump, discharging each a jet across the end of the adjacent pipe in such manner that liquid is sucked up through each pipe and atomized and projected forwardly in a jet of spray. The spray of pure oil between the two aqueous sprays centralizes the oil-feed in the combined jet, and as the combined jet progresses the sprays commingle in such manner that the atoms of oil are interspersed with the atoms of water without being individually diluted, so that a uniform deposit on a plant may be effected without necessarily diluting the oil prior to its contact with the plant. This gives a greater efficiency to the resulting spray as an insect-destroyer, while greatly economizing the proportion of oil relatively to that of the water.

According to another feature of improvement our invention provides a plurality of widely-separated atomizers for drawing from the same tank and which can be fed from the same pump. In doing this we employ, preferably, two atomizers C at remote points and a connection between these and the one air-pump, on the one hand, and a connection between them and the one source of liquid-supply, on the other hand. As shown in Fig. 1, atomizers C are located near the extremities of the tank B, and each is composed of a plurality of individual atomizers $a$ and $b$ and $c$ and $d$. Preferably the two remote atomizers are formed in a single tube M, constituting an air-chamber extending along the top of and in axial parallelism with the tank B, which tube is connected at its middle by a tube N with the air-pump D. In this way two widely-separated sprays may be discharged from the same apparatus, so that both sides of a plant may be simultaneously sprayed.

According to another feature of improvement we construct the tank B as a cylinder extending on an axis at right angles to the axis of the pump and in the same plane as the latter axis, the convex side wall of the tank entering the end of the pump and closing such end, as best seen in Fig. 2. This makes a very strong and cheap connection, while giving a tank of large capacity.

According to another feature of improvement the adjustable valve O of the reservoir L is controlled by a spring-handle P, having a point Q, which may be sprung into any of the notches R of a gage-plate S on top of the tank. In this way the oil-supply from either reservoir can be adjusted independently of the other and danger of accidental disadjustment is avoided. The oil-tanks are preferably soldered on the convex front of the tank B, which keeps them in line with the pump D and makes a very strong and compact construction. The oil-reservoirs and the tank B each have filling-nozzles T, closed by screw-caps U.

In use the oil-reservoirs will be charged with oil and the tank with water or such other charges as it may be desired to atomize will be introduced in these members. The sprayer will then be held in one hand and the pump operated with the other, the user directing the spray from one set of atomizers at one row of plants and that of the other at another row of plants, or both jets may be directed at the single row, one so as to strike one side of the plant and the other so as to strike the other side thereof.

It will be seen that our invention provides improvements which can be readily and advantageously availed of, and it will be understood that we do not limit ourselves to particular details of construction, arrangement, and combination set forth as constituting the preferred form of our invention, since our improvements may be availed of in whole or in part, as circumstances or the judgment of those skilled in the art may dictate, without departing from the spirit of the invention.

In Fig. 3 the tank B' is similar to that shown in Figs. 1 and 2, as is also the oil-reservoir L'; but a single central atomizer C is shown as formed on the end of a pipe M', fed from a pipe N' and having a square end in which the holes $a$ and $c$ for the air-jets are formed and opposite which the oil-pipe $b$ and the water-pipes $d$ terminate.

In Fig. 4 two separate pipes $M^2$ are shown as fed by branch pipes $N^2$ from the pump D and each as having a single atomizing-hole $e$ opposite a single water-pipe $f$ in the square forward end $g$ of the pipe. The tank B is here used alone either for atomizing water, a solution, or oil only.

What we claim is—

1. In sprayers, the combination with an air-pump and a tank, of an air-tube above the tank having air-outlets near its respective extremities, an air-pipe connecting said tube intermediate of its ends with said pump, and liquid-pipes communicating with said tank and terminating in proximity to said outlets, whereby a plurality of widely-separated jets of spray can be discharged from the one apparatus.

2. In sprayers, the combination with a pump-cylinder adapted to be held in the hand and having an open end, of a liquid-tank consisting of an elongated cylinder extending at right angles to said pump-cylinder with its axis horizontal in the normal operating position and having its cylindrical wall fitting in and closing the open end of the latter, a liquid-pipe extending into said tank and having its lower end near the lowest portion of the same, and an air-jet tube extending from said pump to the upper end of said pipe.

3. In sprayers, the combination with an air-pump, a liquid-tank, and a liquid-reservoir, of a plurality of atomizers receiving air from said pump, and the one receiving liquid from said tank and the other receiving liquid from said reservoir, whereby separate differential sprays may be simultaneously projected.

4. In sprayers, the combination with an air-pump, a liquid-tank, and a liquid-reservoir, of a plurality of atomizers receiving air from said pump, and connections between said atomizers and said tank and reservoir supplying one of said atomizers with liquid from one of said parts, and the other of said atomizers with liquid from the other of said parts.

5. In sprayers, the combination with an air-pump, a tank, and a reservoir, of a plurality of atomizers, one intermediate of the others, and connections feeding the intermediate one from said reservoir and the others from said tank.

6. In sprayers, the combination with an air-pump and a reservoir, of an atomizer comprising an air-outlet fed by said pump, a liquid-outlet from said reservoir, a valve controlling the latter outlet, an elastic handle P for said valve, and a holder S for holding said handle in position.

7. In sprayers, the combination with a pump

A, and tank B, of an air-pipe N rising from the pump and extending forwardly over the tank, and an atomizer carried by the forward end of said pipe and consisting of a plurality of air-outlets and a plurality of liquid-tubes extending from the tank and terminating adjacent to said outlets.

8. In sprayers, a pump A, in combination with a tank B, a reservoir L, an air-pipe M, and an atomizer C comprising air-holes $a\ a\ c\ c$ and tubes $b\ d\ d$, said tube $b$ fed from said reservoir and said tubes $d$ fed from said tank.

In witness whereof we have hereunto signed our names in the presence of two subscribing witnesses.

CLINTON H. LEGGETT.
FRANK STONE-BURROWS.

Witnesses:
GEORGE H. FRASER,
THOMAS F. WALLACE.